(12) United States Patent
Ferrer

(10) Patent No.: US 6,845,973 B2
(45) Date of Patent: Jan. 25, 2005

(54) AIR SPRING WITH RESTRAINING CYLINDER

(75) Inventor: David A. Ferrer, Westfield, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/328,604

(22) Filed: Dec. 23, 2002

(65) Prior Publication Data

US 2004/0026837 A1 Feb. 12, 2004

(Under 37 CFR 1.47)

Related U.S. Application Data

(60) Provisional application No. 60/401,884, filed on Aug. 7, 2002.

(51) Int. Cl.$^7$ .............................. F16F 9/04; F16D 1/00
(52) U.S. Cl. ............................ 267/64.24; 267/64.21; 403/223
(58) Field of Search ......................... 267/64.11, 64.15, 267/64.19, 64.21, 64.23, 64.24, 64.25, 64.26, 64.27, 121, 122, 124; 188/322.16, 322.17, 322.18, 322.19, 322.12; 280/124.157, 124.158; 403/220, 223, 345, 381

(56) References Cited

U.S. PATENT DOCUMENTS

| | | | |
|---|---|---|---|
| 3,046,000 A | | 7/1962 | Polhemus et al. |
| 3,839,116 A | * | 10/1974 | Thomas et al. ............. 156/138 |
| 4,200,270 A | | 4/1980 | Merkle |
| 4,270,442 A | * | 6/1981 | Bainard et al. ............... 92/168 |
| 4,325,541 A | * | 4/1982 | Korosladanyi et al. ..... 267/220 |
| 4,697,797 A | * | 10/1987 | Gold ........................ 267/64.24 |
| 4,718,650 A | * | 1/1988 | Geno ........................ 267/64.27 |
| 4,722,516 A | | 2/1988 | Gregg |
| 4,741,517 A | | 5/1988 | Warmuth, II et al. |
| 4,762,308 A | | 8/1988 | Geno |
| 4,796,870 A | * | 1/1989 | Hoffman et al. ............... 267/35 |
| 5,120,151 A | * | 6/1992 | Farris et al. .................. 403/24 |
| 5,129,634 A | | 7/1992 | Harris |
| 5,180,145 A | * | 1/1993 | Watanabe et al. ......... 267/64.24 |
| 5,316,273 A | | 5/1994 | Vaphiadis |
| 5,667,203 A | | 9/1997 | Romer |
| 5,996,980 A | * | 12/1999 | Frey et al. ................ 267/64.27 |
| 6,116,584 A | | 9/2000 | Romer |
| 6,511,057 B1 | * | 1/2003 | Berg ........................ 267/64.27 |
| 2001/0053082 A1 | * | 12/2001 | Chipkatti et al. |
| 2003/0094740 A1 | * | 5/2003 | Weber |

FOREIGN PATENT DOCUMENTS

| | | |
|---|---|---|
| DE | 19 08 373 A | 9/1970 |
| DE | 20 64 751 A | 8/1972 |
| DE | 3934821 A1 * | 4/1991 |
| DE | 4414577 A1 * | 11/1995 |
| DE | 298 23 508 U | 8/1999 |
| FR | 1 482 824 A | 6/1967 |
| WO | WO 01 26921 A | 4/2001 |

* cited by examiner

Primary Examiner—Matthew C. Graham
Assistant Examiner—Melody M. Burch
(74) Attorney, Agent, or Firm—Michael Sand; Michael R. Huber

(57) ABSTRACT

An air spring has first and second axially spaced end members with a flexible bellows sealingly clamped to the end members and extending therebetween and forming an intervening air chamber. A flexible elastomeric sleeve having at least one convolution resiliently mounts a rigid restraining cylinder to one of the end members. The cylinder extends co-axially along and outside of the bellows. The flexible sleeve is bonded or snap-fitted to the cylinder.

9 Claims, 6 Drawing Sheets

AIR SPRING WITH RESTRAINING CYLINDER

CROSS REFERENCE TO RELATED APPLICATIONS

This patent application is a standard utility filed off of provisional patent application Ser. No. 60/401,884 filed Aug. 7, 2002.

BACKGROUND OF THE INVENTION

1. Technical Field

The invention relates to an air spring, and in particular to an air spring having an outer rigid restraining cylinder which extends along the flexible bellows of the air spring. Even more particularly, the invention relates to the resilient mounting of the restraining cylinder to the air spring.

2. Background Information

Pneumatic springs commonly referred to as air springs, are used for many applications including motor vehicles to provide cushioning between movable parts of the vehicle, primarily to absorb shock loads impressed on the vehicle axles by the wheels striking an object in the road or falling into a depression. The air spring usually consists of a flexible rubber sleeve or bellows containing a supply of compressible air and usually will have a piston connected to an open end of the bellows and movable with respect to an opposite member and the bellows. The piston causes compression and expansion of the air within the bellows as the bellows compresses and expands as the vehicle experiences the road shock. This bellows is formed of a flexible elastomeric material containing reinforcing cords and permits the piston to move axially with respect to an end cap secured within an opposite open end of the sleeve from the piston.

Rigid or semi-rigid restraining cylinders are becoming more prevalent for air spring applications as the size of the air spring decreases to fit within the available space and the desire for longer durability. These restraining cylinders are usually mounted on the upper end member of the air spring and extend co-axially along the bellows to prevent excessive radial movement of the bellows during compression and expansion of the air spring. The cylinders also prevent the bellows from becoming damaged by contacting adjacent vehicle components.

One problem encountered with the use of these outer restraining cylinders is the attachment of the cylinder to the air spring end member. One common attachment is a radiator-type clamp or various types of swage rings which securely clamp the upper end of the cylinder to the end member. This is satisfactory for some applications where there is very limited tilting or arcuate movement of the air spring. Likewise, where the restraining cylinder has some flexibility, this decreases this flexing problem. However, the type of attachment is critical where a rigid cylinder, such as one formed of metal, is utilized since it provides little, if any, arcuate movement to the air spring without subjecting the cylinder and/or internal bellows to possible damage.

BRIEF SUMMARY OF THE INVENTION

The present invention provides an air spring with a rigid outer restraining cylinder which is secured to one of the end members of the air spring by a resilient or flexible mounting attachment to permit increased arcuate tilting movement of the cylinder and air spring with respect to the end member when absorbing forces exerted on the vehicle in which the air spring is mounted. This enables a greater range of arcuate motion related to the suspension geometry and vehicle suspension system.

The air spring of the present invention includes a resilient sleeve having at least one convolution which resiliently mounts the rigid cylinder to the end member to provide increased arcuate motion of the air spring with respect to its end mounting member and provides a cylinder able to withstand the harsh environment in which the air spring is utilized.

Another feature of the invention is forming the rigid cylinder of metal such as aluminum or stamped steel, which provides the desired rigidity and durability.

A further advantage of the invention is to secure one end of the flexible convoluted elastomeric sleeve to one portion of the end member by a swage ring and to the restraining cylinder at another end of the sleeve with a spring clip or plurality of projections formed on the sleeve, which projections are snap-fitted into openings formed in an end of the restraining cylinder.

Another feature of the invention is to bond the flexible convoluted sleeve to the upper open end of the restraining cylinder to provide a permanent connection therebetween with the other end of the sleeve being secured to the end member by a swage ring.

Another advantage of the invention is to secure both the flexible mounting sleeve and air spring bellows to a single end member at axially spaced locations by a pair of swage rings with the bellows swage ring being located radially inwardly from the swage ring which secures the flexible bellows on the end member.

A further advantage of the invention is to provide an air spring which will operate in automotive suspension applications where restraining cylinders are required due to extreme vehicle loads, limited packaging allowance, or need for enhanced ride characteristics. This flexible mounting will provide approximately 10° of suspension articulation and as the vehicle's suspension goes through full stroke, the restraining cylinder will cover or restrict excessive outward movement of the air spring bellows and the flexible attachment sleeve will allow a greater amount of movement in both the axial and radial direction without failure.

The foregoing advantages, construction, and operation of the present invention will become readily apparent from the following description and accompanying drawings.

DETAILED DESCRIPTION OF THE INVENTION

Figure 1:
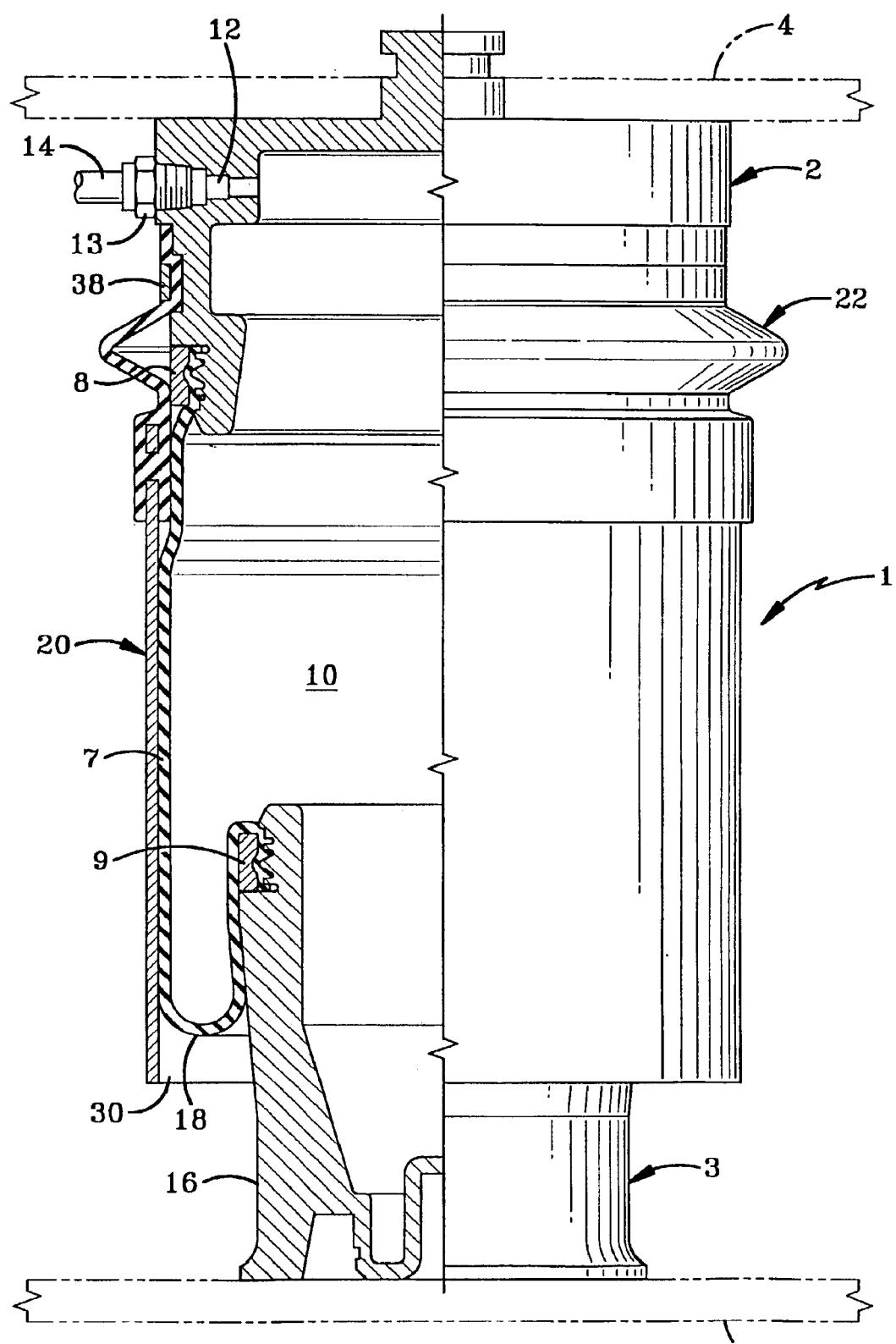
FIG. 1 is a side elevational view of an air spring with the rigid restraining cylinder flexibly mounted thereon, with portions broken away and in section.

The improved air spring of the present invention is indicated generally at 1, and is shown in FIG. 1 mounted between a pair of spaced end members 2 and 3, which are attached to spaced vehicle components 4 and 5 of a vehicle suspension system. A flexible elastomeric sleeve or bellows 7 extends between and is sealingly connected to end members 2 and 3 by clamp rings 8 and 9 respectively. Bellows 7 forms an interior fluid pressure chamber 10 which contains a compressable fluid, usually air, which is supplied thereto through an inlet opening 12 formed in end member 2. A coupler 13 may be secured in opening 12 and is connected to a source of pressurized fluid by conduit 14. End member 2 is shown in the drawings as an end cap, with end member 3 being a piston having a tapered annular sidewall 16 along which a rolling lobe 18 of bellows 7 will move as the end members move axially towards and away from each other when absorbing road shock imparted onto the wheels of the vehicle. The particular construction of end members 2 and 3 can vary without effecting the invention.

In accordance with the main feature of the invention, a rigid restraining cylinder indicated generally at 20, is mounted to end member 2 by a flexible mounting assembly indicated generally at 22. Cylinder 20 is rigid and preferably is formed of metal such as aluminum or stamped steel, but could be a rigid plastic material without effecting the concept of the invention.

Figure 2:
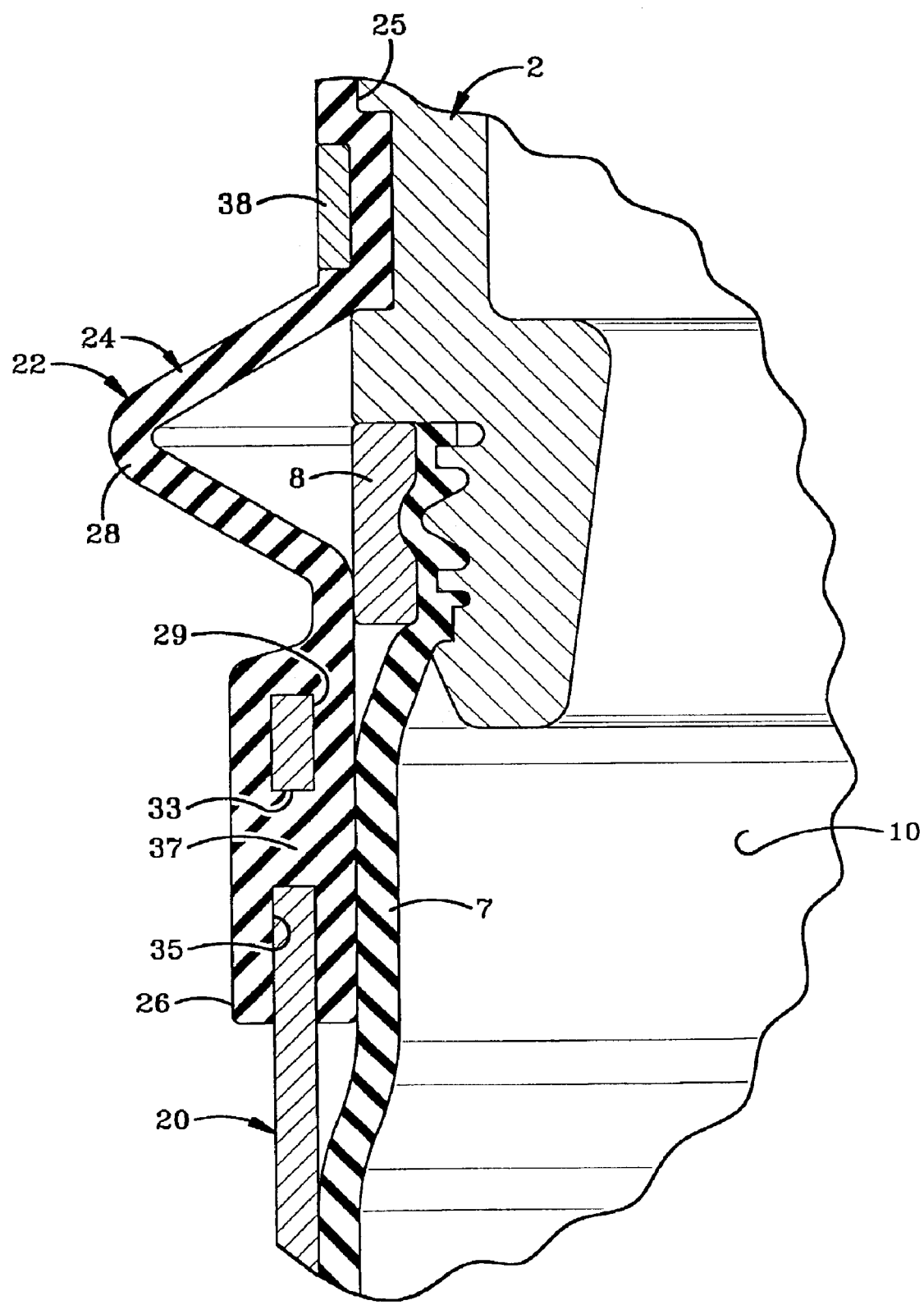
FIG. 2 is a greatly enlarged fragmentary sectional view of the flexible mounting of the rigid restraining cylinder on one of the end members.
Figure 4:
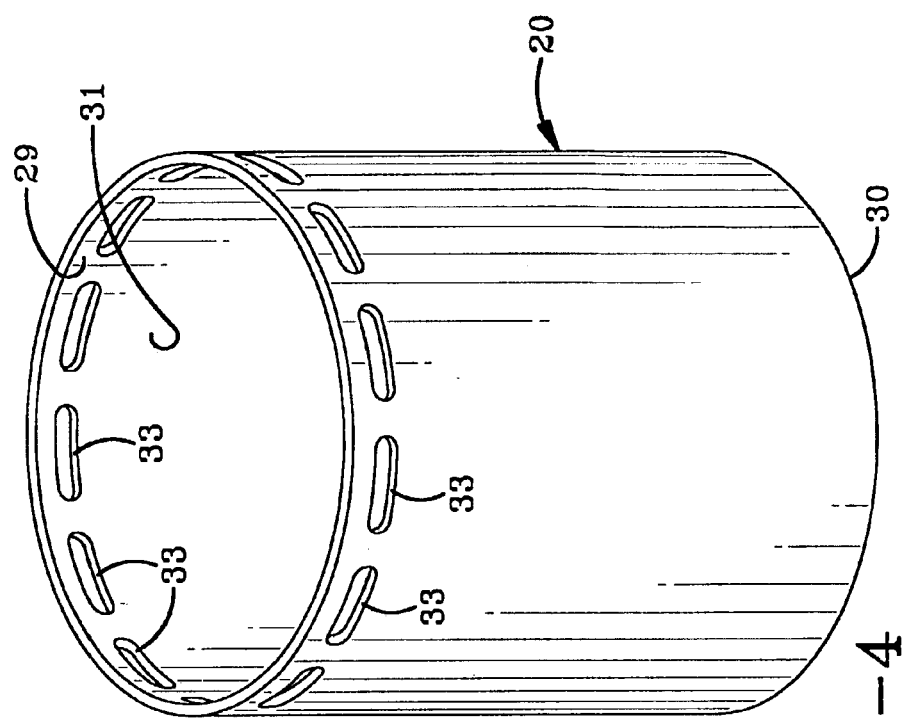
FIG. 4 is a perspective view of the rigid restraining cylinder.
Figure 3:
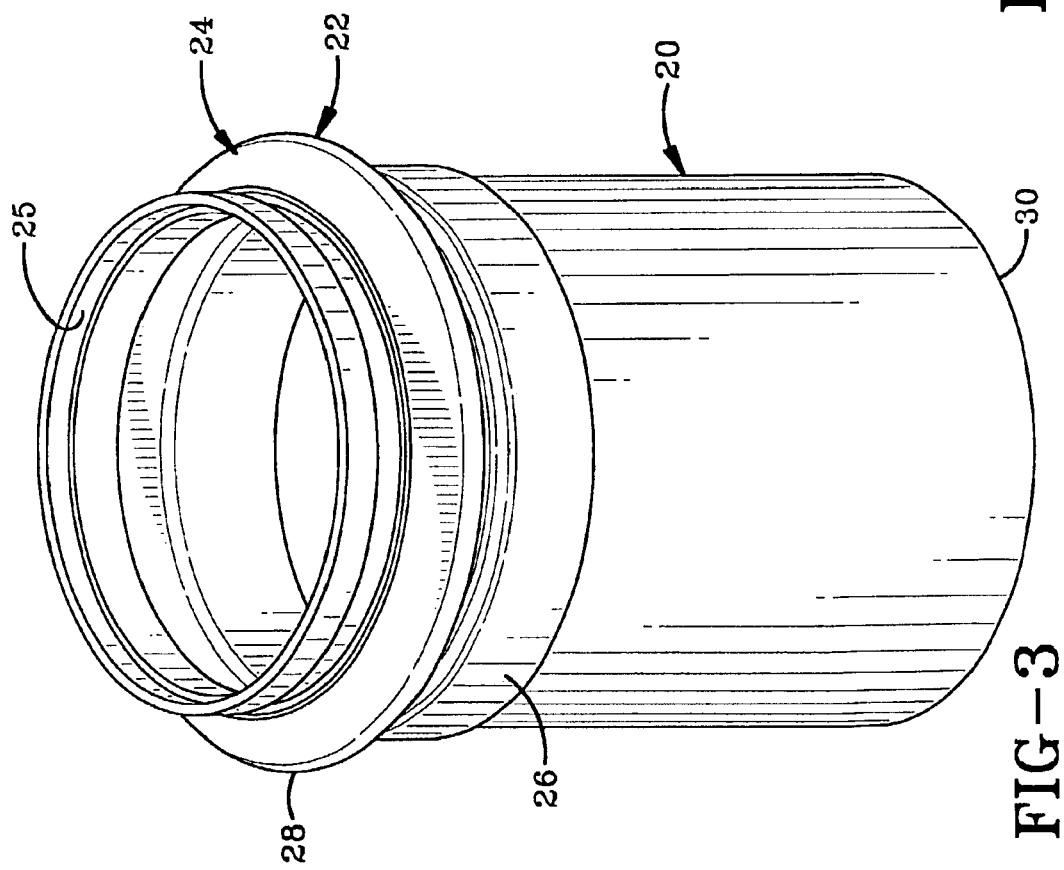
FIG. 3 is a perspective view of a first embodiment the restraining cylinder and flexible mounting assembly secured thereto.

A first embodiment of flexible mounting assembly 22 is shown in FIGS. 2–4 and includes a flexible sleeve indicated generally at 24, which has open first and second ends 25 and 26 and a radially outwardly extending convolution 28 located therebetween. Cylinder 20 includes opposed open ends 29 and 30 and a hollow interior 31 with a circumferentially extending series of slotted holes 33 formed adjacent open end 29. The second end 26 of flexible sleeve 24 has a generally rectangular shaped thickened portion and is formed with an axially extending slot 35 throughout its circumference. End 29 of cylinder 20 is inserted into slot 35 and is bonded to sleeve end 26 by an adhesive, heat bonding or other securing means. Portions of the elastomeric material of sleeve 24 indicated at 37, extend through slotted holes 33 to assist in bonding sleeve end 26 to the upper end 29 of cylinder 20 as shown in FIG. 2.

Opposite end 25 of sleeve 24 is secured by a clamp ring 38 which is usually swaged to end member 2, to form a secure connection therebetween. As shown in FIG. 2, swage ring 38 is spaced axially above clamp ring 8 and radially outwardly therefrom. FIG. 3 shows the completed flexibly mounted assembly after sleeve 24 has been bonded to cylinder 20. All that is required is to telescopically insert bellows 7 through hollow interior 31 of cylinder 20 and apply ring 38 thereto to securely clamp and resiliently mount rigid cylinder 20 on end member 2.

Referring to FIG. 1, axial movement of end members 2 and 3 with respect to each other will insure that cylinder 20 prevents excessive outward movement of bellows 7 where it could become damaged by contacting adjacent vehicle components. However, flexible mounting sleeve 24 permits considerable arcuate movement of end members 2 and 3 with respect to each other, usually up to 10°, still providing protection for bellows 7. The use of convolution 28 provides for considerably increased flexibility and arcuate movement than if a straight section of elastomeric material was utilized. Likewise, the rigidity of cylinder 20 will prevent the cylinder and protected bellows from damage should the cylinder contact an adjacent vehicle component, and it will resist deterioration from the harsh environment in which the air spring is mounted where it is subjected to dirt, debris, road salt, etc. Cylinder 20 also prevents much of the road debris from accumulating and contacting bellows 7.

Figure 5:
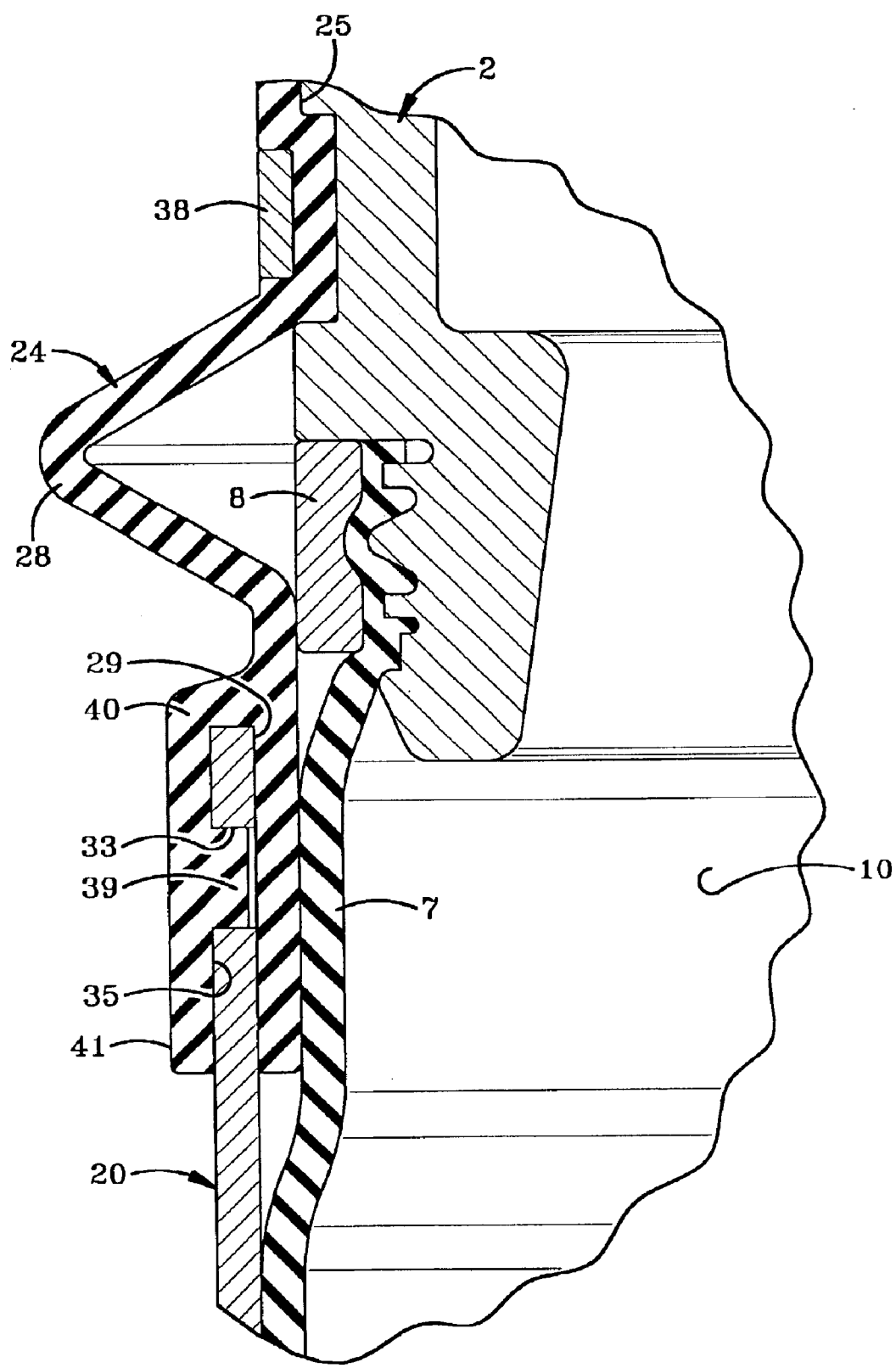
FIG. 5 is an enlarged fragmentary sectional view similar to FIG. 2 of a modified attachment of the flexible mounting sleeve to the rigid restraining cylinder.

A modified arrangement for securing flexible mounting assembly 22 to cylinder 20 is shown in FIG. 5. This arrangement is similar to that described above and shown in FIGS. 1–4. The main difference is that thickened end 26 of sleeve 24 is snap-fitted onto the upper end of cylinder 20 by molding end 26 with a projection 39 which is snap-fitted into slotted holes 33. Thus, cylinder 20 is inserted into slot 35 and with projections 39 being snap-fitted into slotted holes 33. The flexibility of end 26 enables these projections to easily enter into holes 33 with the flexibility of the elastomeric material biasing the projections into holes 33. The upper portion or leg 40 of end 26 will enable the outer leg-like portion 41 of end 26 to flex sufficiently to permit the insertion of cylinder 20 into slot 35 to provide for the snap-fit engagement therewith.

Figure 6:
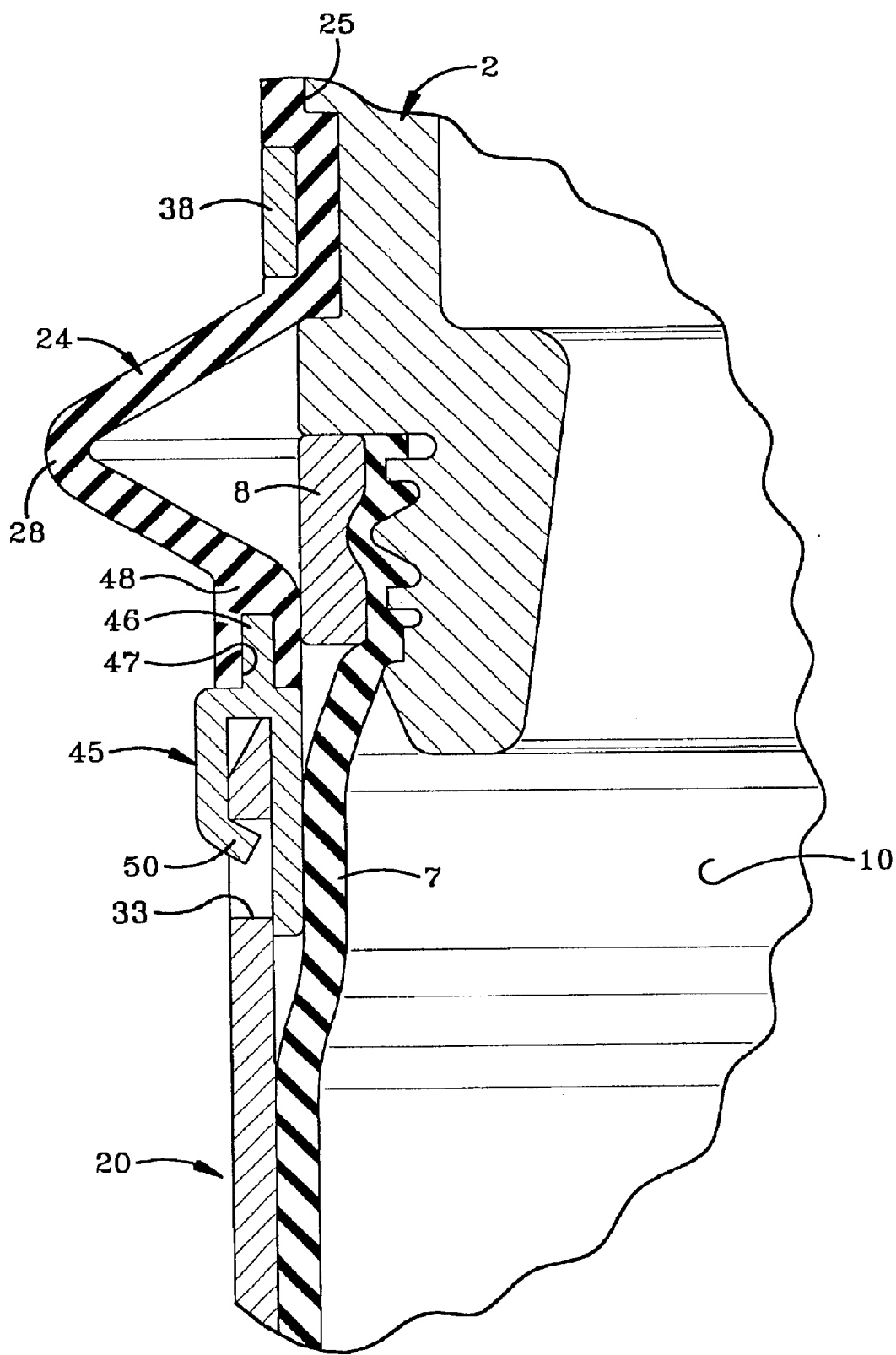
FIG. 6 is an enlarged fragmentary sectional view similar to FIGS. 2 and 5 of another modified mounting arrangement of the flexible sleeve to the rigid restraining cylinder.

Still another flexible mounting arrangement for connecting flexible sleeve 24 to cylinder 20 is shown in FIG. 6. A series of spring metal clips 45, each of which has an annular flange 46 is inserted into a small groove 47 formed in a shortened thickened end 48 of sleeve 24 and is bonded thereto. Each spring clip 45 includes a spring leg 50 which is snap-fitted into a selected slotted hole 33 of cylinder 20 in a somewhat similar fashion as are projections 39 as shown in FIG. 5, to mount cylinder 20 to sleeve 24 as shown in FIG. 6. Thus, sleeve 24 is formed by molding or securing by some manner a plurality of spring clips 45 to end 48, with spring legs 50 then being snap-fitted onto cylinder 20 either before or after cylinder 20 is placed about bellows 7 and clamped by swage ring 38 to end member 2.

Figure 7:
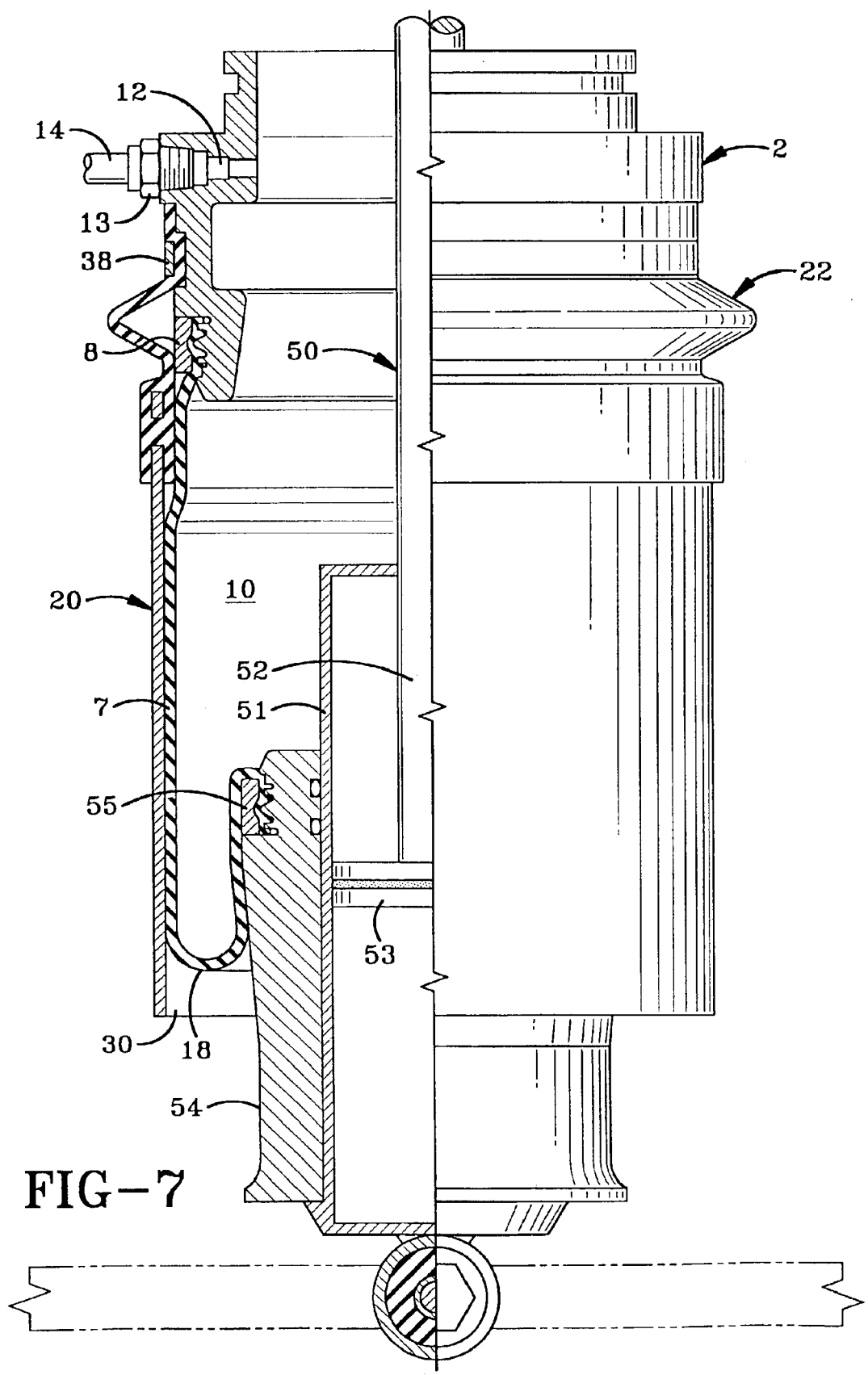
FIG. 7 is a side elevational view of an air spring with the flexibly mounted rigid restraining cylinder in combination with a fluid damper, with portions broken away and in section.

FIG. 7 shows the air spring being combined with a damper indicated generally at 50. Damper 50 includes a cylinder 51 which will usually contain a hydraulic fluid, with a piston rod 52 and piston 53 being reciprocally mounted therein. An air spring piston 54 is secured to the outer surface of cylinder 51 with the flexible bellows 7 being secured thereto by a swage ring 55. The particular mounting of rigid cylinder 20 to sleeve 24 to provide for the flexible attachment is similar to that described above and shown in FIGS. 1–6.

Accordingly, the improved air spring and resiliently mounted rigid restraining cylinder combination provides an effective, safe, inexpensive, and efficient assembly which achieves the numerated objectives, provides for eliminating difficulties encountered with prior assemblies, and solves problems and obtains new results in the art.

While the embodiments of the invention have been described, the invention is not limited thereto. The claims of the invention follow.

What is claimed is:

1. An air spring comprising:
   first and second spaced end members;
   a flexible bellows sealingly attached to the end members and extending therebetween and forming an interior fluid chamber;
   a rigid restraining cylinder having first and second ends attached at said first end to the first end members by a flexible mounting assembly, and extending co-axially along and outwardly of the flexible bellows;

a plurality of spaced holes formed in the cylinder adjacent said first end thereof;

said flexible mounting assembly including an elastomeric sleeve having a first end secured to the first end members and a second end being secured to said restraining cylinder;

a circumferential slot formed in the second end of the elastomeric sleeve, said first end of the cylinder extending into the slot with portions of the elastomeric sleeve extending through the spaced holes to attach the cylinder to the elastomeric sleeve of the flexible mounting assembly;

a first clamp ring securing the first end of the elastomeric sleeve to the first end member;

a second clamp ring securing a first end of the bellows to the first end member; and the first and second clamp rings spaced axially apart on the first end member.

2. The air spring defined in claim 1 wherein the first clamp ring is spaced radially outwardly from the second clamp ring.

3. The air spring defined in claim 1 wherein the restraining cylinder is formed of metal; and in which the elastomeric sleeve is bonded to said cylinder.

4. The air spring defined in claim 1 wherein the restraining cylinder is formed of aluminum.

5. The air spring defined in claim 1 wherein the restraining cylinder is formed of stamped steel.

6. The air spring defined in claim 1 wherein the first end members is an end cap; and in which the second end member is an air spring piston.

7. The air spring defined in claim 6 wherein a fluid damper is connected to and is co-axial with the air spring piston and with the bellows.

8. The air spring defined in claim 1 wherein the flexible mounting assembly includes a generally V-shaped convolution extending in a radially outwardly direction.

9. An air spring comprising:

a pair of spaced end members;

a flexible bellows sealingly attached to the end members and extending therebetween and forming an interior fluid chamber;

a rigid restraining cylinder having first and second ends attached at said first end to one of said end members by a flexible mounting assembly, and extending co-axially along and outwardly of the flexible bellows;

said flexible mounting assembly including an elastomeric sleeve having a first end secured to the one of said end members and a second end formed with a circumferential slot;

a plurality of holes formed in the cylinder adjacent said first end thereof; and a plurality of radially extending projections molded integrally with the sleeve adjacent to the second end thereof, said first end of the cylinder extending into the circumferential slot of the elastomeric sleeve with said projections being snap-fitted within the holes formed in the restraining cylinder to attach said restraining cylinder to the sleeve.

* * * * *

UNITED STATES PATENT AND TRADEMARK OFFICE
CERTIFICATE OF CORRECTION

PATENT NO. : 6,845,973 B2
DATED : January 25, 2005
INVENTOR(S) : David A. Ferrer It is certified that error appears in the above-identified patent and that said Letters Patent is hereby corrected as shown below:

Column 4,
Line 65, change "to the first end members" to -- to the first end member --.

Column 5,
Line 4-5, change "to the first end members" to -- to the first end member --.
Lines 30-31, change "the first end members" to -- the first end member --.

Signed and Sealed this

Twenty-fourth Day of January, 2006

JON W. DUDAS
*Director of the United States Patent and Trademark Office*